March 9, 1948.  J. H. LONG ET AL  2,437,608
COAXIAL OPTICAL SYSTEM FOR DISPLACEMENT GAUGES
Filed March 8, 1946

INVENTORS
JOHN H. LONG
WALTER LUPISH
BY M. O. Hayes
Attorney

Patented Mar. 9, 1948

2,437,608

UNITED STATES PATENT OFFICE 2,437,608

COAXIAL OPTICAL SYSTEM FOR DISPLACEMENT GAUGES

John H. Long, New York, and Walter Lupish, New Hyde Park, N. Y., assignors to the United States of America, as represented by the Secretary of the Navy Application March 8, 1946, Serial No. 652,908

4 Claims. (Cl. 88—14)

This invention relates to an optical displacement gauge operating on the principle that light intensity varies with distance and employing photoelectric means for measuring changes in light intensity. More particularly this invention pertains to an improved optical system for the gauge.

Copending application, Serial Number 652,906, filed March 8, 1946, by John Long, Stephen J. Martin and Frank A. Hester, discloses and claims a development of the gauge with a recording device. Copending application, Serial Number 652,907, filed March 8, 1946, by John Long, discloses and claims an improved beaded reflecting screen used on the element whose displacement is to be measured.

Various mechanical gauges have been used in the past to measure the movement of an element such as a flat plate. However, when substantial and rapid movement of the plate takes place as in the case of a ship bulkhead subjected to an explosion, such gauges are inadequate due to the inertia of the mechanical elements which must be suddenly accelerated. These gauges also do not have sufficient range. Furthermore, the shock to directly connected mechanical gauges adversely affects their accuracy and makes them difficult to calibrate.

An object of this invention is to provide a featherweight gauge which requires no direct connection between the stationary portion of the gauge and the observed element, and accurately measures rapidly accelerated movements of the observed element.

Another object is to provide a compact and efficient optical system for the gauge.

Another object is to provide a gauge having sufficient range to measure substantial movements.

Another object is to provide a gauge which is easily calibrated and which holds its calibration.

A further object is to provide a gauge whose readings are not greatly affected by the angle of the element whose displacement from the gauge is being measured.

The invention also resides in certain novel features of optical component structure and arrangement which facilitate the carrying out of the foregoing objects and which contribute both to the simplicity of the optical gauge and to the reliability of operation as well as to the ease and expeditious manner of taking measurements.

These results are obtained by an optical gauge in which a substantially parallel-ray beam of light modulated at high frequency is projected through an optical system upon a reflecting medium on the element being observed. Light from the reflecting medium returns to a photocell in the optical unit and is converted into high frequency electric currents whose intensity varies in accordance with the intensity of reflected light. The intensity of the reflected light varies in accordance with the distance between the fixed optical unit and the moving element under observation. The varying electrical currents produced have values which are a function of the position of the moving element and which may be measured by suitable means.

The gauge is disclosed in its preferred form employing visible light. However, invisible light such as infrared and ultraviolet radiation may also be used.

Other objects and advantages of the invention will become apparent from the following detailed description taken in connection with the accompanying drawing, in which.

Figures 1, 2:
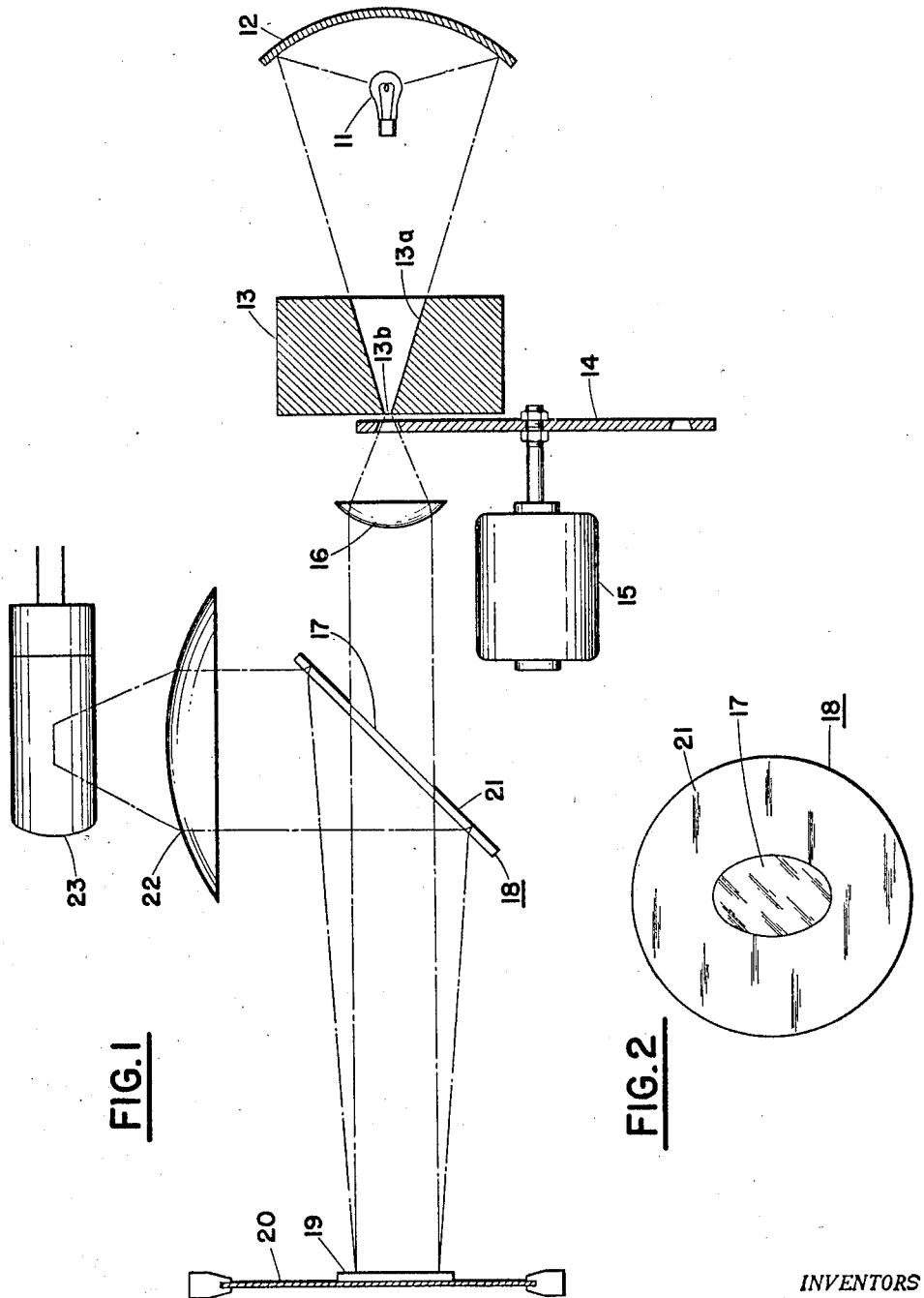
Figure 1 is a general view of the apparatus.
Figure 2 is a detailed view of the light transmitting mirror.

While the invention is susceptible of various modifications and alternative arrangements, we have shown in the drawings and will herein describe in detail the preferred embodiments. It is to be understood, however, that we do not intend to limit the invention by such disclosure for we aim to cover all modifications and alternative arrangements falling within the spirit and scope of the invention as defined in the appended claims.

Figure 1 shows a light source 11 and a concave mirror 12 arranged to send light through an aligned aperture reflector 13 which light is interrupted by aperture disc 14 driven at high speed by motor 15. The aperture reflector 13 is conical with polished inside walls 13a. The apex opening 13b is quite small (about one-sixteenth inch), and faces away from the light source to provide substantially a point source of light. This light is projected in a substantially parallel-ray beam through lens 16 and clear portion 17 of mirror 18, which is set approximately 45° to the axis of lens 16, to the reflecting medium 19 on observed element 20. The light is returned from element 20 along the axis of lens 16 to the silvered mirror portion 21 which faces element 20. The mirror portion 21 reflects the light to lens 22 and to photocell 23 which face the mirror on an axis approximately at right angles to the axis of lens 16. The diameter of lens 22 is greater than that of the mirror. The variations of current in the photo-cell are measured by suitable means.

Reflecting medium 19 may be white paper, light colored paint, or a beaded glass screen as shown in copending application, Serial Number 652,907, filed March 8, 1946, by John Long.

Mirror 18, although shown in a preferable form having a clear central portion 17, may be a partially silvered reflector or may take other forms of partially transmitting partially reflecting mirrors.

When the gauge is in operation a displacement of the element 20 toward the light source 11 will reduce the distance the light has to travel not only from the light source 11 to the reflecting screen 19 but also from the reflecting screen to the photo-cell 23. As light intensity varies inversely with the distance from the source this decrease in distance will increase the intensity of the light received by the photo-cell 23. The resulting higher reading on the measuring means gives an indication of the displacement. This change in reading may be calibrated to provide exact measurement of the distance moved by the element. When the element moves away from the light source there will be a corresponding decrease in the intensity of light reaching the photo-cell.

What we claim is:

1. In an optical gauge for detecting an element's displacement, a light source, a lens and reflector system aligned with the light source for projecting a substantially parallel-ray beam of light, a diffuse reflector mounted in operative position on the displaceable element in the light beam, a light transmitting mirror at approximately 45° to the axis of the light source and lens-reflector system and facing away from them, and a light intensity detecting device facing the mirror on an axis at approximately right angles to the first axis, the light beam passing through the mirror to the reflecting means and returning on substantially the same path to the mirror which directs it to the detecting device.

2. The optical gauge system of claim 1 in which the reflector is the surface of a conical aperture with the apex opening located near the projection lens to provide a substantially point source of light.

3. The optical gauge system of claim 1 in which the light source is modulated at a relatively high frequency.

4. In an optical gauge for detecting an element's displacement, a light source modulated at a relatively high frequency, a concave reflector facing the light source, an aligned conical aperture reflector on the opposite side of the light source with its apex opening away from the source, a lens near the apex opening for projecting a substantially parallel-ray beam of light, reflecting means mounted in operative position on the displaceable element in the light beam, a light transmitting mirror at approximately 45° to the axis of the lens and light source facing away from them, a collecting lens of greater width than the mirror facing the mirror on an axis approximately at right angles to the first axis, and a light intensity detecting device aligned with the collecting lens.

JOHN H. LONG.
WALTER LUPISH.

REFERENCES CITED

The following references are of record in the file of this patent:

UNITED STATES PATENTS

| Number | Name | Date |
|---|---|---|
| 1,455,795 | Logan | May 22, 1923 |
| 1,863,363 | Zworykin | June 14, 1932 |
| 1,866,581 | Simjian | July 12, 1932 |
| 2,315,282 | Snow | Mar. 30, 1943 |
| 2,386,816 | Scholz | Oct. 16, 1945 |

FOREIGN PATENTS

| Number | Country | Date |
|---|---|---|
| 363,219 | Italy | Sept. 22, 1938 |